United States Patent
Jones

(10) Patent No.: US 10,800,075 B2
(45) Date of Patent: Oct. 13, 2020

(54) VEHICLE INTERIOR PART AND METHOD OF MANUFACTURING SAME

(71) Applicant: Faurecia Interior Systems, Inc., Auburn Hills, MI (US)

(72) Inventor: Kenneth Jones, Clifford, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 58 days.

(21) Appl. No.: 16/200,244

(22) Filed: Nov. 26, 2018

(65) Prior Publication Data

US 2020/0164552 A1 May 28, 2020

(51) Int. Cl.
| | |
|---|---|
| *B29C 45/00* | (2006.01) |
| *B29C 45/14* | (2006.01) |
| *B29C 45/26* | (2006.01) |
| *B29C 45/34* | (2006.01) |
| *B29L 31/30* | (2006.01) |

(52) U.S. Cl.
CPC .... *B29C 45/0025* (2013.01); *B29C 45/14795* (2013.01); *B29C 45/2608* (2013.01); *B29C 45/34* (2013.01); *B29C 2045/0034* (2013.01); *B29L 2031/3014* (2013.01)

(58) Field of Classification Search
CPC .......... B29C 45/0025; B29C 45/14795; B29C 45/2608; B29C 45/34; B29C 2045/0034; B29L 2031/3014
See application file for complete search history.

(56) References Cited

U.S. PATENT DOCUMENTS

| | | | |
|---|---|---|---|
| 5,011,211 A | * | 4/1991 | Svensson ............... B60J 3/0282 296/97.1 |
| 5,217,732 A | | 6/1993 | Rudolf et al. |
| 6,471,276 B1 | | 10/2002 | Brunsman et al. |
| 6,939,500 B2 | | 9/2005 | Bernard |
| 2001/0028131 A1 | | 10/2001 | Brodi, Jr. et al. |
| 2014/0375073 A1 | | 12/2014 | Schmidt et al. |

FOREIGN PATENT DOCUMENTS

| | | | | |
|---|---|---|---|---|
| DE | 2061100 A1 | * | 8/1971 | ............. B60R 22/28 |
| EP | 2684744 A1 | | 1/2014 | |

OTHER PUBLICATIONS

European Office Action corresponding to European Application No. EP 19 21 0536, dated Mar. 5, 2020, 7 pages.

\* cited by examiner

*Primary Examiner* — Lori L Lyjak
(74) *Attorney, Agent, or Firm* — Reising Ethington P.C.

(57) ABSTRACT

An interior part for a vehicle is formed by core-back expansion molding. The interior part includes a foamed plastic body formed by injecting a foamable plastic resin into a mold and separating the mold portions of the mold to allow foaming expansion of the foamable plastic resin. An edge portion of the foamed plastic body includes a projecting freeze section and a core-back expansion radius located adjacent to the projecting freeze section. The projecting freeze section is formed in a freeze seal area of the mold adjacent a parting line to help prevent excessive flashing of material at the parting line during separation.

14 Claims, 3 Drawing Sheets

VEHICLE INTERIOR PART AND METHOD OF MANUFACTURING SAME

TECHNICAL FIELD

The invention relates generally to vehicle interior parts and is particularly pertinent to core-back expansion molded interior parts made from a foamable plastic resin.

BACKGROUND

Core-back expansion molding involves injecting a foamable plastic resin into an injection mold at a nominal thickness that is less than the desired thickness of the part to be formed. Once filled, the mold is opened along a parting line to a set distance (e.g., by removing clamp pressure or mechanically separating the mold). The foamable plastic resin can then expand to create a part having a thickness corresponding to the set distance at which the mold is opened. The finished part includes a foamed plastic body that can be significantly lighter than alternatively formed part. This can be particularly desirable for fuel economy purposes in the automotive industry.

When the mold is opened during the manufacturing process, flashing over at the parting line may occur. This flash over can result in a misformed edge region. U.S. Pat. No. 5,217,732 to Rudolf et al. tries to solve the flashing over problem by creating an angled parting line. This solution, however, can result in expensive tooling modifications. Further, the angled parting line may not be suitable for some specifically designed parts that need to comply with various automotive related specifications.

SUMMARY

In accordance with various embodiments, there is provided an interior part for a vehicle and a vehicle comprising an interior part. The interior part comprises a foamed plastic body. The foamed plastic body comprises an outboard side configured to face away from an interior cabin of the vehicle, an inboard side configured to face toward the interior cabin of the vehicle, and an edge portion located between the outboard side and the inboard side. The edge portion comprises a projecting freeze section and a core-back expansion radius located adjacent to the projecting freeze section.

In some embodiments, the edge portion further comprises an outboard side extension.

In some embodiments, the outboard side extension has a terminal wall and an interior wall.

In some embodiments, the interior wall of the outboard side extension and the core-back expansion radius form an interior valley.

In some embodiments, the interior valley includes an angled junction point between the interior wall of the outboard side extension and the core-back expansion radius.

In some embodiments, the projecting freeze section has a terminal wall and an interior wall.

In some embodiments, the interior wall of the projecting freeze section directly opposes the interior wall of the outboard side extension.

In some embodiments, the interior wall of the projecting freeze section and the core-back expansion radius meet at a curved junction point.

In some embodiments, the foamed plastic body has a plurality of microcellular pores.

In some embodiments, the interior part is an interior door panel.

In accordance with various embodiments, there is provided a method of manufacturing an interior part for a vehicle, comprising the steps of: injecting a foamable plastic resin into a mold, the mold having a first mold portion, a second mold portion, and a parting line between the first mold portion and the second mold portion; moving the first mold portion or the second mold portion to separate the first mold portion and the second mold portion at the parting line; and filling a freeze seal area with the foamable plastic resin. The freeze seal area is located adjacent to the parting line and is configured to seal the parting line during movement of the first mold portion or the second mold portion.

In some embodiments, the interior part comprises a foamed plastic body. The foamed plastic body comprises an outboard side configured to face away from an interior cabin of the vehicle, an inboard side configured to face toward the interior cabin of the vehicle, and an edge portion located between the outboard side and the inboard side. The edge portion comprises a projecting freeze section and a core-back expansion radius located adjacent to the projecting freeze section.

In some embodiments, the first mold portion is a core side and the freeze seal area extends into the first mold portion.

In some embodiments, the projecting freeze section is formed in the freeze seal area.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION

Described below is a vehicle interior part having a foamed plastic body formed by core-back expansion molding. Using the methods described herein, an approximately 25% weight reduction can be achieved, as compared with similar parts formed in accordance with standard injection molding or other manufacturing processes. However, since core-back expansion involves separation of two or more mold cavities to facilitate expansion of the foamable plastic resin, flashing over at the parting line can occur. To address this problem, a freeze seal area in the injection mold can be provided adjacent to the parting line. Filling the freeze seal area with the foamed plastic resin can create a corresponding freeze section in the formed vehicle interior part. The freeze section imparts a dam-like effect to help lessen or prevent flashing over at the parting line. Moreover, creating a freeze seal area in the injection mold can be easier than other methods involving more complex tooling reconfigurations and redesigns.

Figure 1:
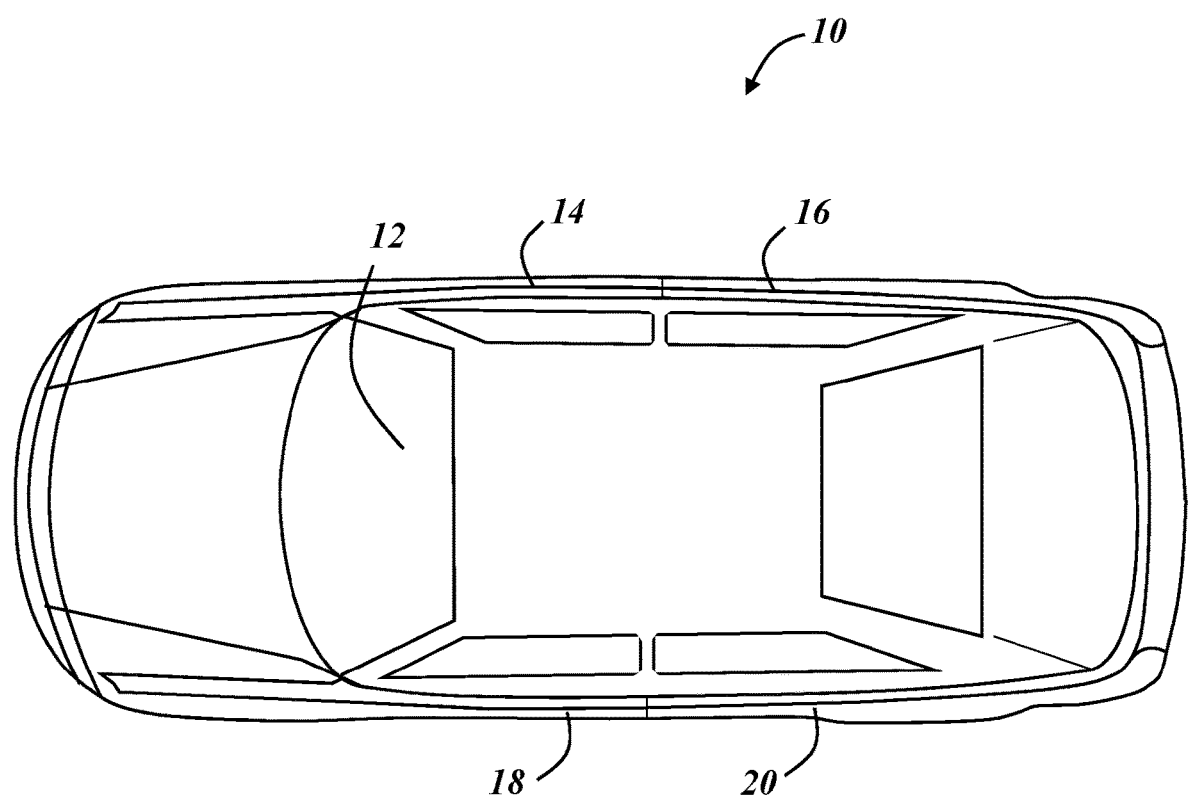
FIG. 1 is a top view of an automotive vehicle.

FIG. 1 is a top view of an automotive vehicle 10. The automotive vehicle 10 has an interior cabin 12 that is accessible via a number of doors 14, 16, 18, 20. Each door 14, 16, 18, 20 includes an interior door panel, such as the interior door panel 22 shown in FIG. 2. The figures and description are more focused on vehicle panels such as interior door panels; however, the presently disclosed features and techniques may be advantageously or preferably used with any other core-back expansion formed interior parts, such as instrument panels, defrosters, steering wheel panels, seat panels, pillar panels, and roof panels, to name a few.

Figure 2:
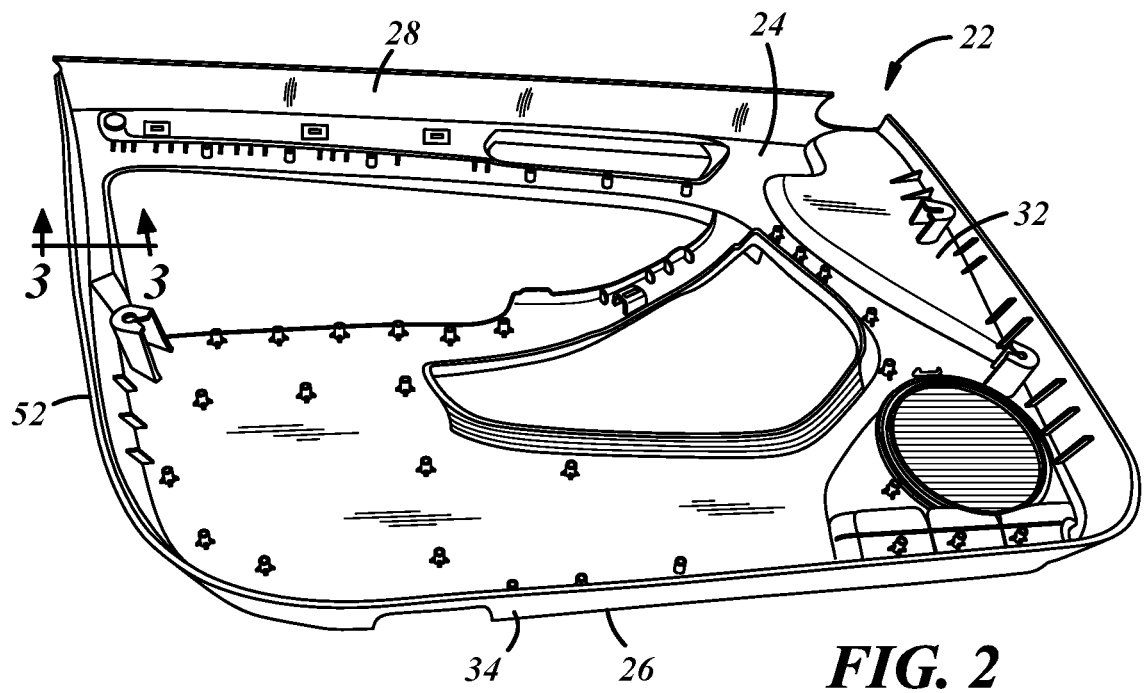
FIG. 2 shows a vehicle interior part from the automotive vehicle in FIG. 1, and more particularly, is an outboard view of an interior door panel.

The interior door panel 22 shown in FIG. 2 is installed on the inboard side of one or both of the right-side doors 14, 16. Similar interior panels may be used on the inboard side of left-side doors 18, 20. The terms "inboard" and "outboard" are generally used to orient various vehicle components closer toward the interior cabin 12 (i.e., "inboard") or facing away from the interior cabin 12 (i.e., "outboard"). FIG. 2 shows the outboard side 24 of the door panel 22. The outboard side 24 of the door panel 22 can also be referred to as the B-side. The inboard side 26 of the door panel 22 faces the interior cabin 12 of the vehicle 10, and the inboard side 26 can also be referred to as the A-side. In various interior panel embodiments, other layers may be located on the inboard side 26, such as one or more skin layers and/or foam layers.

The interior door panel 22 includes a foamed plastic body 28 formed by core-back expansion molding a foamable plastic resin. The foamed plastic body 28 includes a plurality of microcellular pores 30 (only a few are labeled in the cross-sectional view of FIG. 3, which is taken along line 3-3 in FIG. 2). In the illustrated embodiment, the panel 22 has a generally smooth surface 32 on the outboard side 24 and a rough or textured surface 34 on the inboard side 26, with the microcellular pores 30 distributed throughout the body 28. When a foamable plastic resin material is inserted into a mold, as shown in FIG. 4 and detailed further below, the microcellular pores 30 form when the mold portions are separated, forming a directionally distributed pore network 36 that extends from the outboard side 24 toward the inboard side 26 as one of the mold portions moves away from the outboard side 24 to allow expansion of the foamable plastic resin.

Materials for the foamable plastic resin for the body 28 may depend on the part implementation. For example, different materials may be used depending on whether the part is generally visible to the interior cabin 12 or generally non-visible. In particular embodiments, a fiber reinforced polypropylene (e.g., PPLGF20) can be used for non-visible parts such as a structural panel or a defroster, whereas a talc-filled thermoplastic olefin (e.g., ultra-high flow, medium impact, 20% talc-filled TPO) can be used for visible, mold in color parts such as the interior door panel 22. Other plastic materials are certainly possible, such as other PP based materials, other TPO based materials, acrylonitrile butadiene styrene (ABS) based materials, and polyphenylene oxide (PPO) based materials, to cite a few examples. The plastic material is mixed with a chemical foaming agent (CFA) to form the foamable plastic resin. In one embodiment, the CFA is ADX 1099 (about 2 wt % of the foamable plastic material) but other CFAs are possible.

Figure 4:
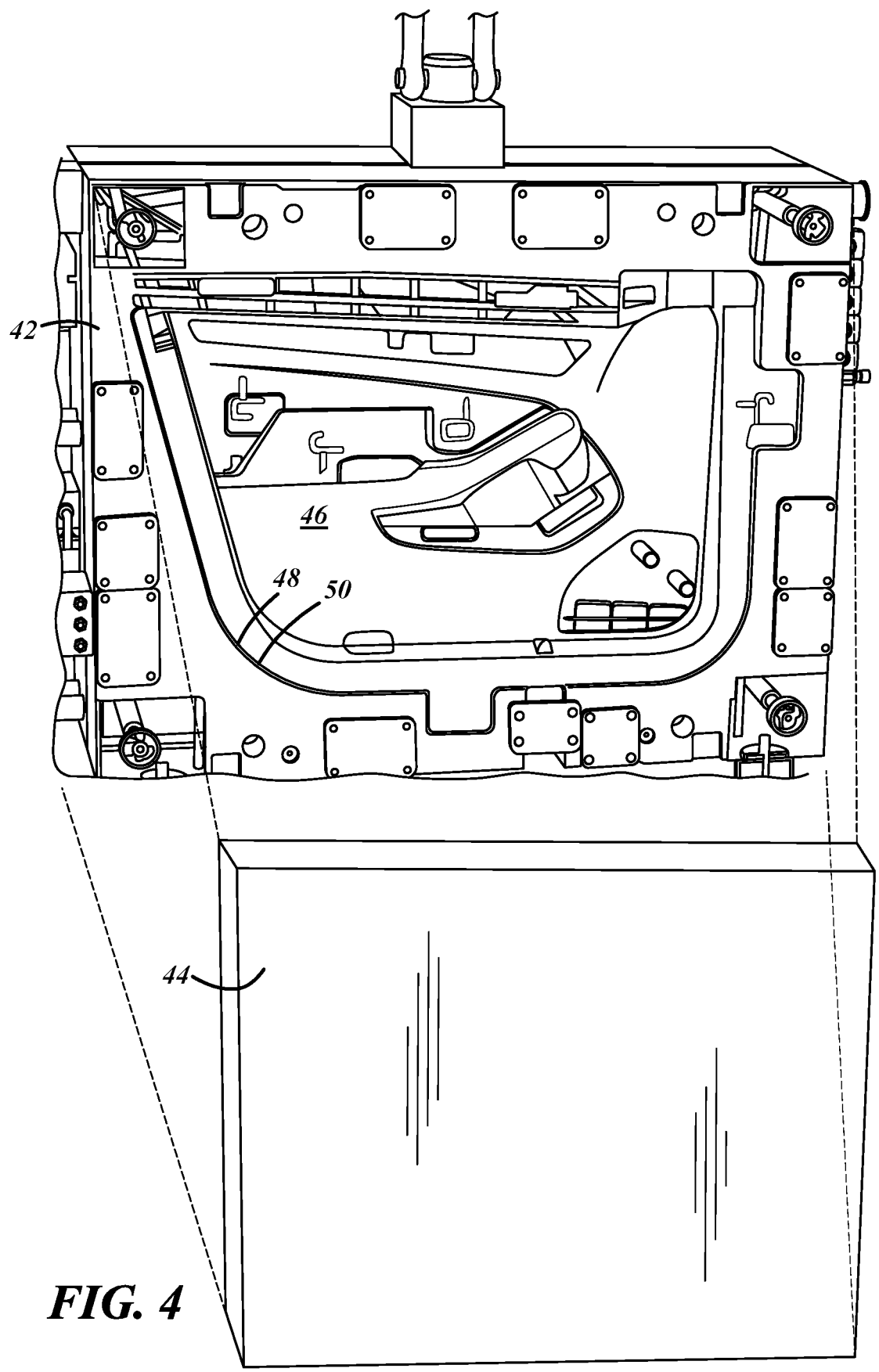
FIG. 4 shows a mold that can be used to manufacture the interior door panel of FIGS. 2-3.

The foamable plastic resin is injected into a core-back expansion mold, such as the mold 40 illustrated in FIG. 4. The mold 40 includes first and second mold portions 42, 44, with the first mold portion 42 having a main core side 46, and the second mold portion 44 being schematically illustrated. It is also possible to have more mold portions than what is illustrated in FIG. 4. Additionally, the mold 40 will have various vents for extracting air/gas from the cavity, various mold features for creating bosses and the like in the formed part, actions, etc. During manufacture, the foamable plastic resin should be kept under pressure to avoid foam expansion until the mold portions 42, 44 are separated. At injection, the first and second mold portions 42, 44 are separated by a nominal thickness which is smaller than the ultimate part thickness. The core side 46 is then retracted along a parting line 48 such that the foamable plastic resin foams between the outboard side 24 (facing with the second mold portion 44) and the inboard side 26 (facing with the core side 46 of the first mold portion 42). For this particular door panel 22 implementation, the nominal thickness is about 1.8 mm. The mold portions can then be separated by about 1 mm to form a part having a part thickness of about 2.8 mm. Other nominal thicknesses, separation distances, and part thickness are certainly possible, and will depend on the desired qualities of the formed interior part. Additional considerations that may go into the manufacturing process include temperature control of the injection material, injection speed, separation speed of the mold portions, resonance or dwell time in the mold, and cooling parameters.

To prevent or lessen flashing at the parting line 48 when the mold portions 42, 44 separate, the mold 40 includes a freeze seal area 50 located adjacent to the parting line 48. The freeze seal area 50 is a rib or groove cut into the core side 46 which can be filled with the foamable plastic resin during injection and create a dam-like effect when the mold portions 42, 44 are separated along the parting line. In other implementations, hydraulic actuators or the like are used to help maintain a steel piece near the parting line to avoid flashing. The freeze seal area 50 allows for a more simplified tooling implementation and/or improved cycle time, as it may not be necessary to include or operate hydraulic actuators mounted on the mold. In one specific embodiment, the freeze seal area 50 is about 0.7 mm deep and 0.7 mm wide, but its dimensions will likely vary depending on the material characteristics, the dimensions of the part to be formed, and the separation parameters.

Figure 3:
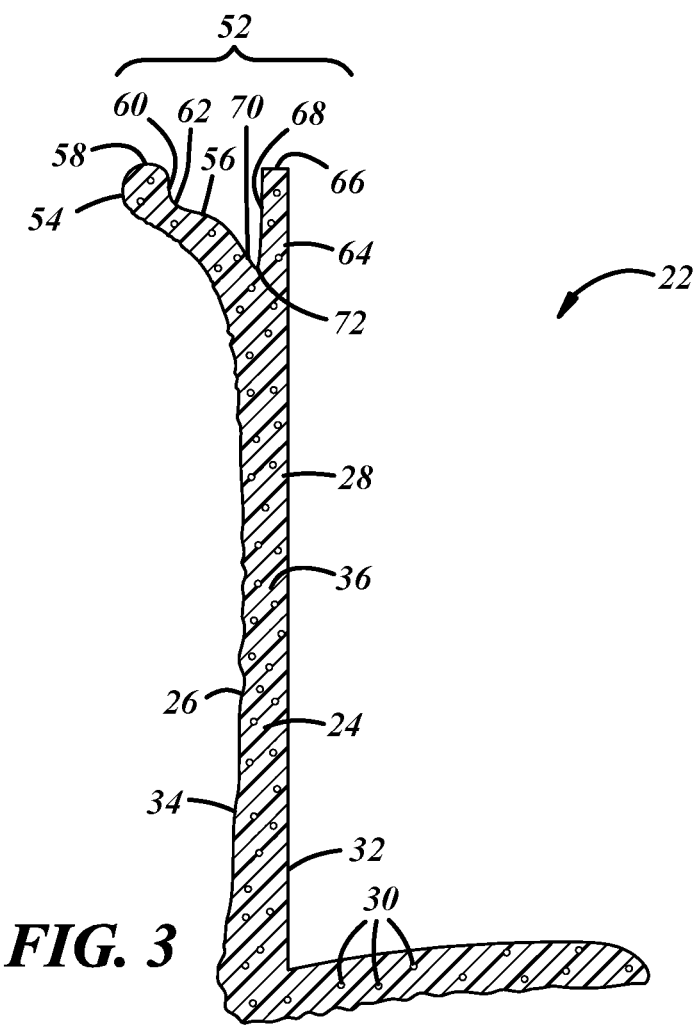
FIG. 3 is a cross section of the interior door panel of FIG. 2, taken along line 3-3 in FIG. 2.

The freeze seal area 50 creates an advantageously configured edge portion 52 in the panel 22, as illustrated in FIG. 3. More particularly, the freeze seal area 50 creates a corresponding projecting freeze section 54 that acts as a plastic dam to prevent excessive flashing. The projecting freeze section 54 is located directly adjacent to a core-back expansion radius 56 and includes a terminal wall 58 and an interior wall 60. The interior wall 60 joins the core-back expansion radius 56 at a curved junction point 62. This edge portion 52 also includes an outboard side extension 64, which may be used for installation purposes when installing the interior door panel 22 to one of the exterior doors 14, 16, 18, 20. The outboard side extension 64 also includes a terminal wall 66 and an interior wall 68. In this embodiment, the interior wall 68 of the outboard side extension 64 and the core-back expansion radius 56 form an interior valley 70. The interior valley 70 includes an angled junction point 72 between the interior wall 68 of the outboard side extension 64 and the core-back expansion radius 56. Additionally, in one particular embodiment, the terminal wall 66 of the outboard side extension 64 is generally aligned with the terminal wall 58 of the projecting freeze section 54. The length or height of the interior wall 60 of the projecting freeze section 54 also corresponds to the depth of the freeze seal area 50. The projecting freeze section 54 helps seal the parting line 48 during expansion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An interior part for a vehicle, comprising:
a foamed plastic body, the foamed plastic body comprising:
an outboard side configured to face away from an interior cabin of the vehicle;
an inboard side configured to face toward the interior cabin of the vehicle; and
an edge portion located between the outboard side and the inboard side, the edge portion comprising:
a projecting freeze section; and
a core-back expansion radius located adjacent to the projecting freeze section.

2. The interior part of claim 1, wherein the edge portion further comprises an outboard side extension.

3. The interior part of claim 2, wherein the outboard side extension has a terminal wall and an interior wall.

4. The interior part of claim 3, wherein the interior wall of the outboard side extension and the core-back expansion radius form an interior valley.

5. The interior part of claim 4, wherein the interior valley includes an angled junction point between the interior wall of the outboard side extension and the core-back expansion radius.

6. The interior part of claim 3, wherein the projecting freeze section has a terminal wall and an interior wall.

7. The interior part of claim 6, wherein the interior wall of the projecting freeze section directly opposes the interior wall of the outboard side extension.

8. The interior part of claim 6, wherein the interior wall of the projecting freeze section and the core-back expansion radius meet at a curved junction point.

9. The interior part of claim 1, wherein the foamed plastic body has a plurality of microcellular pores.

10. The interior part of claim 1, wherein the interior part is an interior door panel.

11. A vehicle comprising the interior part of claim 1.

12. A method of manufacturing the interior part of claim 1, comprising the steps of:
injecting a foamable plastic resin into a mold, the mold having a first mold portion, a second mold portion, and a parting line between the first mold portion and the second mold portion;
moving the first mold portion or the second mold portion to separate the first mold portion and the second mold portion at the parting line; and
filling a freeze seal area with the foamable plastic resin, wherein the freeze seal area is located adjacent to the parting line and is configured to seal the parting line during movement of the first mold portion or the second mold portion.

13. The method of claim 12, wherein the first mold portion is a core side and the freeze seal area extends into the first mold portion.

14. The method of claim 13, wherein the projecting freeze section is formed in the freeze seal area.

\* \* \* \* \*